United States Patent
Dietmann et al.

(10) Patent No.: US 6,353,381 B1
(45) Date of Patent: Mar. 5, 2002

(54) ELECTRICAL TEMPERATURE SENSOR HAVING ONE OR MORE LAYERS

(75) Inventors: Stefan Dietmann, Haiterbach; Margit Sander, Karlstein, both of (DE); Christian Baerts, Beringen-Paal (BE); Karlheinz Wienand, Ashaffenburg (DE)

(73) Assignee: Heraeus Electro-Nite International N.V., Houthalen (BE)

( * ) Notice: Subject to any disclaimer, the term of this patent is extended or adjusted under 35 U.S.C. 154(b) by 0 days.

(21) Appl. No.: 09/353,899

(22) Filed: Jul. 15, 1999

(30) Foreign Application Priority Data

| Jul. 16, 1998 | (DE) | 198 31 862 |
| Jul. 16, 1998 | (DE) | 198 31 861 |
| Apr. 21, 1999 | (DE) | 199 18 003 |

(51) Int. Cl.⁷ ............................................. H01C 7/02
(52) U.S. Cl. ............................ 338/25; 338/28; 338/30
(58) Field of Search ........................... 338/22 R, 25, 338/28, 30; 374/185

(56) References Cited

U.S. PATENT DOCUMENTS

| 4,050,052 A |   | 9/1977  | Reichel et al.    |
| 4,103,275 A | * | 7/1978  | Diehl et al. ................. 338/25 |
| 4,424,507 A | * | 1/1984  | Nagai et al. .............. 338/22 R |
| 5,430,428 A | * | 7/1995  | Gerblinger et al. ........... 338/25 |
| 5,610,572 A | * | 3/1997  | Yajima ..................... 338/22 R |
| 5,735,606 A | * | 4/1998  | Tani et al. .................... 338/25 |
| 5,798,684 A | * | 8/1998  | Endo et al. ................... 338/25 |
| 5,823,680 A | * | 10/1998 | Kato et al. ................ 338/22 R |
| 5,831,512 A | * | 11/1998 | Wienand et al. .............. 338/25 |
| 6,081,182 A | * | 6/2000  | Tomozawa et al. ........... 338/25 |

FOREIGN PATENT DOCUMENTS

| DE | 25 27 739 C3 | 8/1978 |
| EP | 0 327 535 B1 | 9/1991 |

* cited by examiner

Primary Examiner—Karl D. Easthom
(74) Attorney, Agent, or Firm—Akin, Gump, Strauss, Hauer & Feld, L.L.P.

(57) ABSTRACT

An electrical temperature sensor has a platinum-containing resistance layer as a measuring resistor, which is applied on the electrically insulating surface of a ceramic substrate. For protection against contamination or damage, the resistance layer is provided on its side facing away from the ceramic substrate with an intermediate layer as a diffusion barrier layer. In a first embodiment, a platinum layer as an electrode is applied on the intermediate layer spaced from the resistance layer. The electrode protects the measuring resistance against platinum poisons, such as stray silicon ions, which could emerge, for example, from a passivation layer made of glass. In a second embodiment, the electrical temperature sensor is provided with a multiple layer, wherein a covering layer is applied on the intermediate layer as a passivation layer made of glass. Also in this embodiment, an electrode in the form of a platinum layer can be applied spaced from the resistance layer. The intermediate layer functioning as a diffusion barrier layer is made of a ceramic containing $Al_2O_3$, MgO or tantalum oxide. Furthermore, it is also possible to insert an intermediate layer made of a layer system with a series of layers of several oxides.

6 Claims, 4 Drawing Sheets

ELECTRICAL TEMPERATURE SENSOR HAVING ONE OR MORE LAYERS

BACKGROUND OF THE INVENTION

The invention involves an electrical temperature sensor with a resistance layer containing platinum as a measuring resistor provided with electrical connections on an electrically insulating surface of a ceramic substrate, wherein the resistance layer is provided with at least one layer to protect against contamination or damage. In addition, the invention involves in another embodiment an electrical temperature sensor, whose resistance layer for protection against contamination or damage is provided with a multiple layer, which has an electrically insulating intermediate layer and an outer covering layer. Furthermore, the invention relates to a method for manufacturing a temperature sensor with a platinum-containing resistance layer, which is applied and structured in the form of a thin layer on an electrically insulating surface of a ceramic substrate.

As a multiple layer, according to European patent EP 0 327 535 B1, column 2, lines 20–25, a protective covering, consisting of several layers, of a platinum thin-film resistance thermometer is indicated. A multiple layer of this type can have, for example according to lines 26–31, a dielectric layer as an electrically insulating intermediate layer and an outer covering layer.

From European patent EP 0 327 535 B1, a temperature sensor having a thin-film platinum resistance is known. There, the temperature measuring resistance made of platinum is formed on a surface of an electrically insulating substrate, wherein the resistance element is covered with a dielectric protective layer, which preferably consists of silicon dioxide and has a thickness in the range of 2000–4000 Angstroms. In addition, as the covering layer, a diffusion barrier layer is provided, which is applied by deposition of titanium in an oxygen atmosphere for formation of titanium oxide. This barrier layer has a thickness in the range of 6000–12000 Angstroms. Even if the diffusion barrier layer allows the entry of oxygen to the dielectric layer and thus for the most part prevents an attack of nascent metal ions from the glass layer on the platinum layer, extreme ambient conditions can nevertheless lead to an attack on the platinum layer, so that its physical behavior as a temperature measuring resistor is disturbed.

In addition, an electrical measuring resistor for resistance thermometers, as well as a process for manufacturing such an electrical measuring resistor, is known from U.S. Pat. No. 4,050,052 or the counterpart German patent DE 25 27 739 C3.

SUMMARY OF THE INVENTION

An object of the invention is to protect the measuring resistor against external chemical or mechanical attacks and, in particular, to ensure that no entry whatsoever of contamination from the outer atmosphere into the measuring resistor is possible. This object is achieved for an electrical temperature sensor according to a first embodiment of the invention in that, on the resistance layer, an intermediate layer is applied as a diffusion barrier layer, wherein on the side of the resistance layer facing away from the substrate surface and spaced therefrom, an electrode is applied.

Proving to be especially advantageous is the longer lifetime, while at the same time, a relatively cost-effective manufacture is possible, so that the temperature sensor is also suitable as a mass-produced product. Advantageous forms and modifications of the temperature sensor of the first embodiment are described below and in the dependent claims.

The thickness of the intermediate layer preferably lies in the range of 0.2 $\mu$m to 30 $\mu$m. The total height of the temperature sensor lies in the range of 0.1 to 1 mm, while its major surface area has a length in the range of 2 to 15 mm and a width in the range of 0.5 to 6 mm. The temperature sensor carrier with the mounted chip element has the following geometric outer dimensions: total height of the module in the range of 0.3 to 3 mm, wherein the major surface area has a length of 4 to 80 mm and a width of 2 to 12 mm.

The electrode is preferably made of a platinum-containing layer, in particular an additional platinum layer. In a preferred form of the first embodiment, the additional platinum layer is covered by a passivation layer. Preferably, at least a part of the passivation layer is here located between the additional platinum layer and the resistance layer. Such an arrangement has the advantage that the resistance layer is protected from the outside by the passivation layer and is electrically insulated, while the intermediate layer represents an insulation layer between the resistance layer and the platinum layer.

In another advantageous form of the first embodiment, the additional platinum layer is applied on a carrier substrate arranged opposite to and spaced from the measuring resistor. The additional platinum layer here preferably covers a supply line to the measuring resistor, which is applied on the carrier substrate. Furthermore, in an advantageous form, the additional platinum layer is galvanically separated from the supply line by an insulation layer. It proves to be advantageous here that the platinum layer can be biased electrically negative relative to the resistance layer or the supply line, and in addition, the covering of the supply line represents an additional protection.

For protection from an undesired bypass formation between the measuring resistor contacts, caused by the condensation of electrically conducting particles (soot), it has proven to be especially advantageous to seal a gap, between the measuring resistor and the carrier substrate lying opposite it, on all sides using an electrically insulating material—preferably sealing glass.

The object is achieved for an electrical temperature sensor according to the second embodiment of the invention with a platinum-containing resistance layer as a measuring resistor provided with electical contacts on an electrically insulating surface of a ceramic substrate, wherein the resistance layer for protecting against contamination or damage is provided with a multiple layer, that has an electrically insulating intermediate layer and an outside covering layer, wherein the intermediate layer is constructed as a diffusion barrier layer, which has aluminum oxide, magnesium oxide or tantalum oxide or a mixture of two materials of these oxides or a multiple layer system, wherein the covering layer is made as a passivation layer.

Proving to be especially advantageous is the simple and cost-effective design, so that the temperature sensor according to the invention can be manufactured as a mass-produced product. Advantageous forms and modifications of the temperature sensor of the second embodiment are described below and in the dependent claims.

The covering layer is preferably made of glass. In an advantageous form of the second embodiment the covering layer comprises a mixture of silicon oxide, barium oxide and aluminum oxide, wherein the weight ratio of the three oxides lies in the range of 35:50:15. The actual ceramic substrate is preferably made of aluminum oxide.

The thickness of the intermediate layer lies in the range of 0.2 $\mu$m to 30 $\mu$m, while the outer covering layer has a thickness in the range of 10 to 30 μm. The thickness of the entire coating (as a multiple layer) lies in the range of 10.5 to 60 μm.

The total height of a temperature sensor according to the second embodiment lies in the range of 0.1 to 1 mm. Its major surface area has a length in the range of 2 to 15 mm and a width in the range of 0.5 to 6 mm. The geometry of the temperature sensor, constructed according to the second embodiment, on the carrier (module) results in the same ranges for height, length and width as has already been described for the first embodiment.

Proving to be further advantageous is the miniaturized construction method, so that the temperature sensor can also be implemented directly in the exhaust gas for motor vehicle applications up to 1100° C., wherein because of the miniaturization, a redundancy circuit of several temperature sensors is also possible, so that the reliability of the measurement or control system is improved considerably. In addition, the thermal behavior is improved.

Furthermore, in a preferred form of the second embodiment of the invention, an electrode is applied on the side of the resistance layer facing away from the substrate surface outside of the intermediate layer, wherein between the electrode and the resistance layer at least one part of the passivation layer is located. The electrode here is preferably located between the passivation layer and the intermediate layer. Furthermore, in a preferred form, the electrode can be encased by the passivation layer.

The electrode is preferably made of a platinum-containing layer, in particular of an additional platinum layer. It is also possible to arrange the additional platinum layer on the side of the passivation layer facing away from the resistance layer. An advantage thereby results in that the additional platinum layer protects the resistance layer against atmospheric poisoning in the sense of a "sacrificial electrode".

In a further form, the additional platinum layer is provided with an electric connection. Here, it is possible to electrically negatively bias the platinum layer relative to at least one connection of the measuring resistor. It proves to be advantageous therein that the platinum poisons present as positive ions in extreme ambient conditions (Si ions and metal ions) are drawn to the negative platinum layer.

The object is further achieved for a process for manufacturing an electrical temperature sensor with a platinum-containing resistance layer, which is applied and structured in the form of a thin layer on an electrically insulating surface of a ceramic substrate, in that after completion of the structuring, the resistor is provided with a multiple layer for protection against contamination or damage, wherein by use of shading masks for receipt of free contact surfaces, at least one diffusion barrier layer is applied as an intermediate layer, and spaced from the resistance layer an electrically conducting layer is applied as an electrode. As the electrode, a platinum-containing layer, in particular a platinum layer, is preferably applied.

Advantageous forms of the process are described below and in the dependent claims.

Here, the thin layer is preferably structured by the application of a pre-formed photoresist mask and converted by means of ion etching. A structured thin layer has the advantage that, with minimal material usage and on small surfaces, high ohmic resistances can be produced. The described structuring technique is to be preferred over the previously used laser meander process, since the structures produced hereby have very clean structure edges without rim damage. The structures have very long term stability and ideally permit themselves to be tightly covered with a diffusion barrier layer by an adjustable flank steepness (e.g., ramp-shaped).

It has proved advantageous to manufacture the the diffusion barrier layer by thin layer technology, which is applied after the removal of the photoresist mask. By means of thin layer technology the layers may be applied hermetically sealed. The diffusion barrier layer can also be applied by screen printing or plasma spraying. By the use of shading masks, a structure can be applied with the desribed process, such that an expensive and cost-intensive structuring process for obtaining free contacts is dispensed with. In a preferred form of the process, the electrically conducting layer is applied on the diffusion barrier layer as an electrode with connection contacts by use of shading masks by means of a PVD or sputtering process.

It is, however, also possible to apply the electrically conducting layer by means of a screen printing process. This process is preferably used if the electrically conducting layer is applied on a carrier substrate arranged opposite the temperature sensor.

Furthermore, a passivation layer is advantageously applied by means of screen printing on the electrically conducting layer serving as an electrode. The screen printing process proves to be particularly expedient and cost-effective for this purpose.

In the manufacturing process, several blanks of ceramic can form a composite multi-unit substrate, which can be simultaneously cost-effectively coated and only divided by sawing after application of the passivation layer.

In a preferred form, according to both the first and the second embodiments of the invention, the ceramic substrate is made of $Al_2O_3$. Furthermore, according to both embodiments, the intermediate layer is preferably also made of $Al_2O_3$, MgO or a mixture of the two materials, wherein the weight proportion of $Al_2O_3$ lies in the range of 20% to 70%. It is further possible to construct the intermediate layer of a layer sequence of at least two layers, each of which is formed of at least one oxid from the the group $Al_2O_3$, MgO, $Ta_2O_5$. At least one layer can thereby be made from two of the mentioned oxides, wherein preferably a physical mixture of oxides if used. However, it is also possible to use mixed oxides.

In another embodiment of the invention, the group of oxides consisting of $Al_2O_3$, MgO, $Ta_2O_5$ can be expanded to include hafnium oxide.

Preferable, the intermediate layer consists of a one-layer system according to Table 1, with the materials given as items 1 to 6, or of a multiple layer system according to Table 2, that has at least two layers 1 and 2, wherein however, on layer 2 another layers or several layers can be joined. The different coating materials are designed in the individual items or lines with numbers 7 to 30.

TABLE 1

| One-Layer System | |
|---|---|
| 1 | $Al_2O_3$ only |
| 2 | MgO only |
| 3 | $Ta_2O_5$ only |
| 4 | Mixture of $Al_2O_3$/MgO |
| 5 | Mixture of $Al_2O_3$/$Ta_2O_5$ |
| 6 | Mixture of MgO/$Ta_2O_5$ |

TABLE 2

Multiple-Layer System

| | Layer 1 | Layer 2 |
|---|---|---|
| 7 | $Al_2O_3$ only | $Al_2O_3$ only |
| 8 | $Al_2O_3$ only | MgO only |
| 9 | MgO only | MgO only |
| 10 | $Ta_2O_5$ only | $Ta_2O_5$ only |
| 11 | $Ta_2O_5$ only | $Al_2O_3$ only |
| 12 | $Ta_2O_5$ only | MgO only |
| 13 | Mixture of $Al_2O_3$/MgO | $Al_2O_3$ only |
| 14 | $Al_2O_3$ only | Mixture of $Al_2O_3$/MgO |
| 15 | Mixture of $Al_2O_3$/MgO | Mixture of $Al_2O_3$/MgO |
| 16 | Mixture of $Ta_2O_5$/MgO | $Al_2O_3$ only |
| 17 | $Ta_2O_5$ only | Mixture of $Al_2O_3$/MgO |
| 18 | Mixture of $Ta_2O_5$/MgO | Mixture of $Al_2O_3$/MgO |
| 19 | Mixture of $Al_2O_3$/$Ta_2O_5$ | $Al_2O_3$ only |
| 20 | $Al_2O_3$ only | Mixture of $Ta_2O_5$/MgO |
| 21 | Mixture of $Al_2O_3$/MgO | $Ta_2O_5$ only |
| 22 | $Ta_2O_5$ only | Mixture of $Al_2O_3$/$Ta_2O_5$ |
| 23 | $Al_2O_3$ only | Mixture of $Al_2O_3$/$Ta_2O_5$ |
| 24 | Mixture of $Al_2O_3$/MgO | Mixture of $Ta_2O_5$/MgO |
| 25 | Mixture of $Ta_2O_5$/MgO | Mixture of $Ta_2O_5$/MgO |
| 26 | Mixture of $Al_2O_3$/$Ta_2O_5$ | $Ta_2O_5$ only |
| 27 | MgO only | Mixture of $Al_2O_3$/MgO |
| 28 | MgO Only | Mixture of $Al_2O_3$/$Ta_2O_5$ |
| 29 | Mixture of $Al_2O_3$/MgO | MgO only |
| 30 | Mixture of $Al_2O_3$/$Ta_2O_5$ | MgO only |

The use of these materials proves to be especially advantageous, because these metal oxides are still stable at high temperatures. The intermediate layer is preferably manufactured using a PVD-, CVD-, IAD-, IBAD-, PIAD-, or magnetron-sputter-process, wherein the abbreviations mean:

PVD: Physical Vapor Deposition
CVD: Chemical Vapor Deposition
IAD: Ion Assisted Deposition
IBAD: Ion Beam Assisted Deposition
PIAD: Plasma Ion Assisted Deposition.

Furthermore, the passivation layer according to the two embodiments is a mixture made of $SiO_2$, BaO and $Al_2O_3$, wherein the weight proportion of $SiO_2$ lies in the range of 20% to 50%. It proves to be advantageous that this mixture has a high insulation resistance.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings:

FIGS. 1 and 2 are shown in cross-section;

FIG. 4b shows in plan view a completely mounted temperature sensor module according to FIG. 4a;

FIG. 6b shows in plan view a completely mounted temperature sensor using a carrier substrate according to FIG. 6a;

FIG. 8b shows in plan view a completely mounted temperature sensor using a carrier substrate according to FIG. 8a.

DETAILED DESCRIPTION OF THE INVENTION

Figure 1:
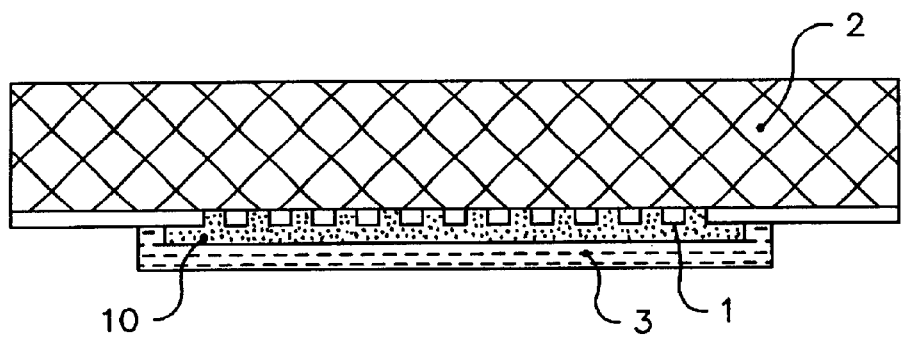
FIG. 1 shows a measuring resistor having a resistance layer on a ceramic substrate, wherine the resistance layer is covered by a diffusion barrier layer and a passivation layer.

According to FIG. 1 the resistance layer 1 functioning as a measuring resistor is located on a flat surface of a ceramic substrate 2, which is made of aluminum oxide. The resistance layer 1 is constructed in the form of a meander having connection contact surfaces, as is known, for example, from German patent DE 40 26 061 C1. The resistance layer 1 is provided on its side facing away from the substrate with a diffusion barrier layer as an intermediate layer 10, which in turn is covered by a passivation layer 3 made of glass. Because of the glass passivation layer, the sensitive structure of the platinum measuring resistance 1 is effectively protected against atmospheric poisoning from the surroundings. The embodiment of a multiple layer structure holds back the silicon ions which are very damaging for the resistance layer 1 made of platinum and which contaminate platinum very quickly at high temperatures by physical diffusion, and thus drastically affect the temperature/resistance function of the resultant platinum alloy, so that the high-temperature stability of the resistance layer 1 no longer exists for temperature measurements. Because of the first thermodynamically stable and pure aluminum oxide layer made as an intermediate layer 10 or diffusion barrier, the entry of silicon ions and other substances or ions that poison the platinum is prevented, and thus, the resistance layer constructed in meander-shape is protected from poisoning. The application of the intermediate layer 10 can be achieved by physical vacuum metallization. The aluminum oxide layer is applied super-stoichiometrially, in such a manner that a very stable layer of pure aluminum oxide ($Al_2O_3$) covers the platinum structure of the resistance layer 1. The silicon ion-containing passivation layer 3 made of glass thus does not make any sort of contact with the active platinum resistance layer, and a sealing off of the resistance layer 1 as mechanical protection against outside contaminating elements is thus ensured.

Figure 2:
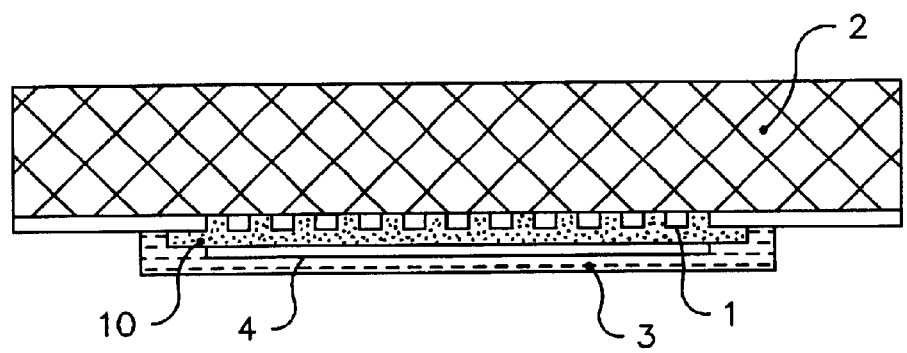
FIG. 2 shows a similar embodiment as FIG. 1, wherein spaced from the resistance layer an additional platinum layer is provided on the diffusion layer; both

According to FIG. 2 the resistance layer 1 made of platinum functioning as measuring resistor is located on a flat surface of a substrate 2 made of aluminum oxide ceramic ($Al_2O_3$). It is preferably constructed in the form of a meander with connection contact pads, as is known from the already mentioned German patent DE 40 26 061 C1. The resistance layer 1 is surrounded on the side facing away from the substrate 2 by a diffusion barrier layer as an intermediate layer 10, wherein this in turn is covered by an outer covering layer as a passivation layer 3 made of glass. Between the passivation layer 3 and the diffusion barrier layer as intermediate layer 10, an additional platinum layer as electrode 4 is applied in a plane parallel to the substrate plane spaced from the resistance layer 1, which should keep silicon ions possibly emerging from the glass passivation layer 3 away from the platinum measuring resistance layer 1, by absorbing the silicon ions. It is thus possible, even in hostile high temperature environments, to have protection against stray silicon ions coming from dissolving silicon oxide compounds of the passivation layer, wherein the otherwise occurring change of the resistance temperature curve of the measuring resistor is prevented by the additional platinum layer 4 which is mounted before it. In this manner, the high-temperature stability of the platinum resistance layer 1, and thus the entire temperature sensor, is maintained for a long measurement period.

Figure 3:
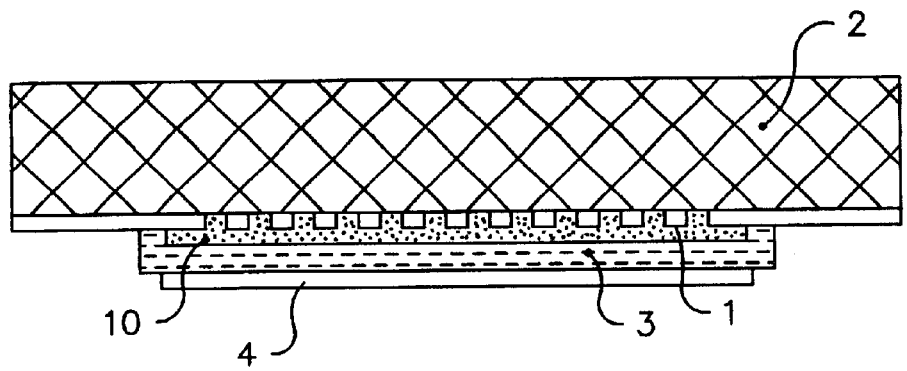
FIG. 3 shows a similar embodiment as FIG. 1, wherein spaced from the resistance layer an additional platinum layer is applied on the passivation layer.

FIG. 3 shows a similar construction as FIG. 1, wherein, however, an additional platinum layer as electrode 4 is provided outside on the outer surface of the passivation layer 3. This platinum layer as electrode 4 is arranged at a uniform distance from the actual resistance layer 1 electrically insulated outside on the passivation layer 3. The additional platinum layer as electrode 4 protects the platinum resistance layer 1 against atmospheric poisoning in the sense of a "sacrificial electrode." For this purpose, the additional platinum layer as electrode 4 is negatively biased relative to resistance layer 1, so that poisoning substances or ions are adsorbed, and the resistance layer 1 is protected.

Figure 5:
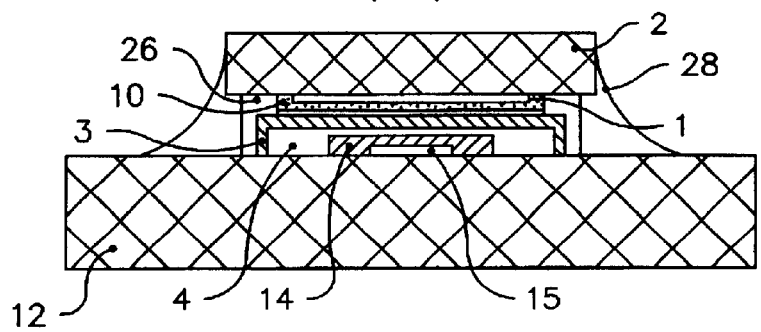
FIG. 5 shows a cross-section along the line V—V of FIG. 4b.
Figure 4A:
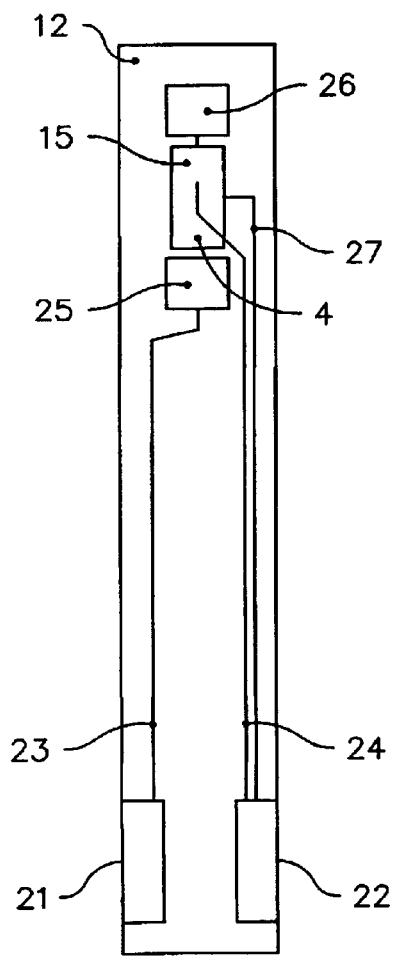
FIG. 4a shows a carrier substrate prepared for the mounting of the sensor (with additional platinum layer), with additional electrode, which is provided with its own connection conduit.
Figure 4B:
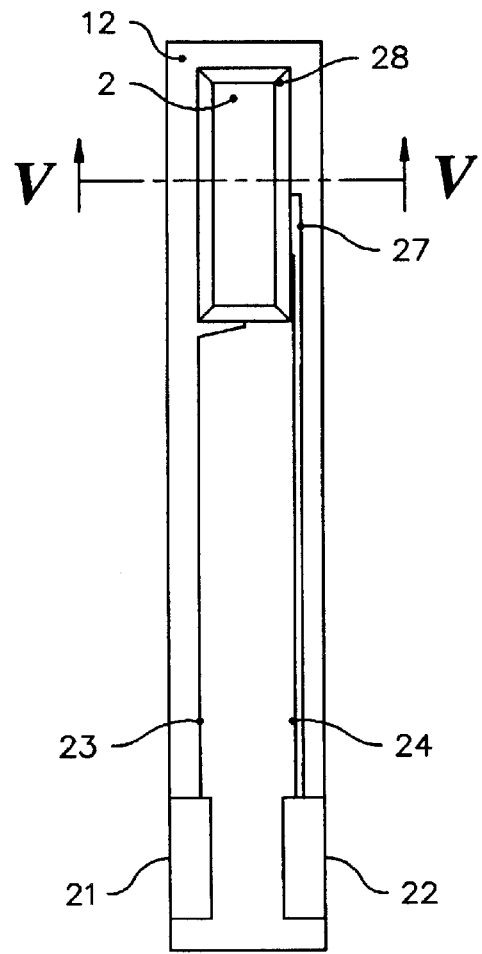

According to FIGS. 4a, 4b and 5, it is further possible to insert the additional platinum layer as electrode 4 with a connection contact pad and, using an external connection, to negatively bias it in relative to the platinum measuring resistor or resistance layer 1. Such a negatively biased platinum layer as electrode 4 has the essential advantage that the ions poisoning the resistance layer 1 are drawn off beforehand.

According to FIGS. 4b and 5, the additional platinum layer as electrode 4 of the temperature sensor is located as a counter electrode (or polarizing electrode) with its outer surface on a carrier substrate 12, which functions for the mechanically fixed mounting and electrical connection of the temperature sensor. Here, along with rapid responsiveness, a certain protection results in practice against mechanical damage of the temperature sensor. According to FIG. 4a, the external connection contact pads 21, 22 are connected via platinum conductors 23, 24, having a small resistance, on the surface of the carrier substrate 12 with connection contact pads 25, 26 for contacting the connection contacts of the resistance layer 1 (FIG. 5). Connection contact pad 26 is here connected to the connection contact pad 25 via the part of the supply line 24 designated by reference numeral 15, wherein the part 15 that is not visible from above is depicted in dashed lines.

Furthermore, the connection 22 is connected with the supply line 27 for contacting the additional platinum layer as electrode 4, that is visible in cross-section according to FIG. 5, wherein supply line 27 leads out separately from connection contact 22. Connection contact 22 is connected to the negative pole of a power supply, whereas connection contact 21 is positively connected in circuit. The connection contact pads 25, 26 for connection with the resistance layer 1 (FIG. 4a, FIG. 5) are applied using sintered-on platinum conductor paste. From FIG. 5 it can be seen that the supply line 24 to the connection contact surface 26, depicted symbolically in FIG. 4a, is applied directly on the carrier substrate 12, where this part of the supply line 24 is provided with the reference numeral 15. Furthermore, in the cross-section it can be seen that the supply line 15 (or 24) is encased by an insulation layer 14, which electrically insulates the supply line 15 from the additional platinum layer as electrode 4, as can be recognized in the cross-section according to FIG. 5. The additional platinum layer as electrode 4 is encased by a passivation layer 3, preferably made of glass, on the side facing away from the carrier substrate 12. The passivation layer 3 is connected mechanically fixed to the intermediate layer 10 as a diffusion barrier layer, in which the resistance layer 1 constructed as a meander—similar to that of FIG. 3—is also embedded. As can be seen from FIG. 5, the measuring resistance layer 1 arranged between the ceramic substrates 2 and 12 is protected well from outer mechanical damage.

A gap occurring between the measuring resistance layer 1 and carrier substrate 12 is sealed according to FIGS. 4b and 5 using sealing material 28, preferably sealing glass, in order to prevent the already mentioned bypass formation between the measuring resistor contacts. The connection contact pads are also sealed in this way.

Figure 6A:
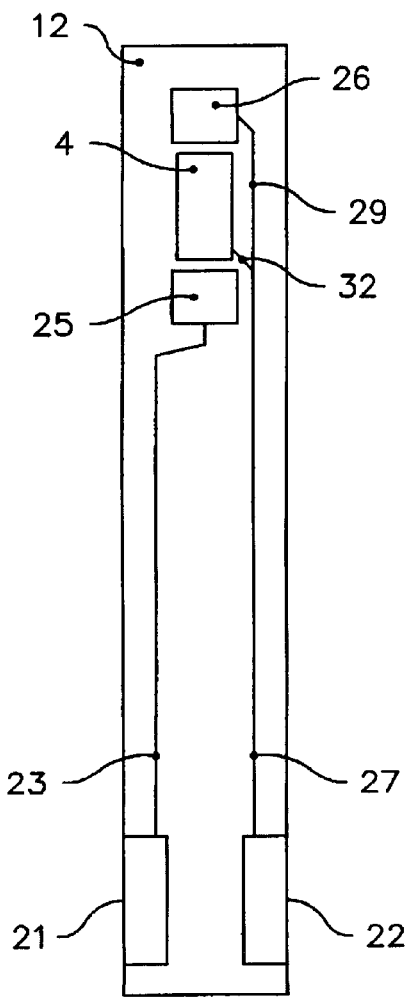
FIG. 6a shows a similar embodiment as FIG. 4a of a carrier substrate (with additional electrode) prepared for application of the resistor, wherein up to the electrode a common conduit is used for the electrode and a connection contact of the resistance layer.

According to FIG. 6a, a similar construction of the temperature sensor as in FIG. 4a is provided, wherein, however, the electrode 4 is connected by a branch 32 to the supply line 27 running between connection contact pad 22 of the sensor and connection contact pad 26 of the resistance layer. The branch running to the connection contact pad 26 is designated by reference numeral 29.

Figure 6B:
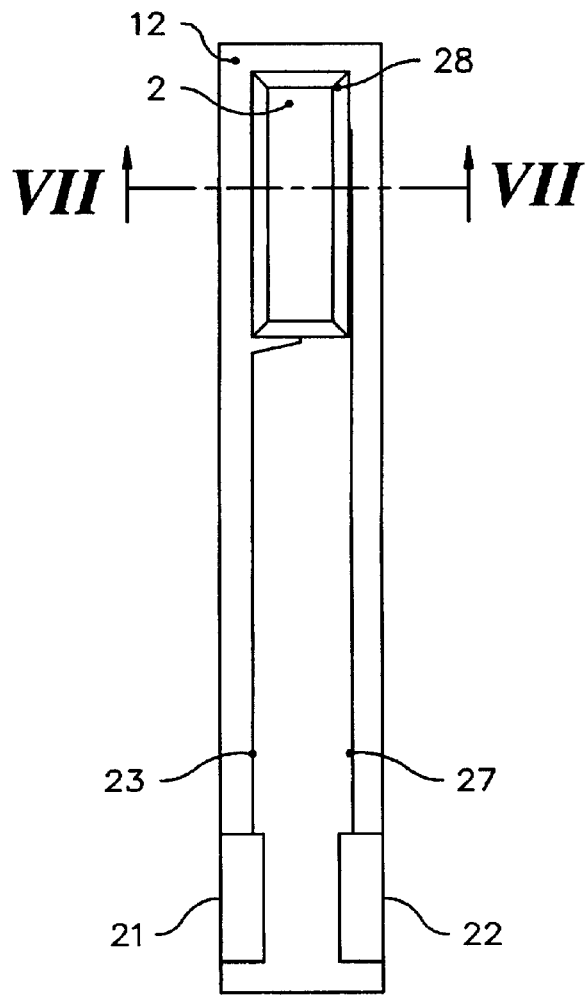

FIG. 6b shows—similar to FIG. 4b—the finished mounted temperature sensor, wherein ceramic substrate 2 is seen in plan view.

Figure 7:
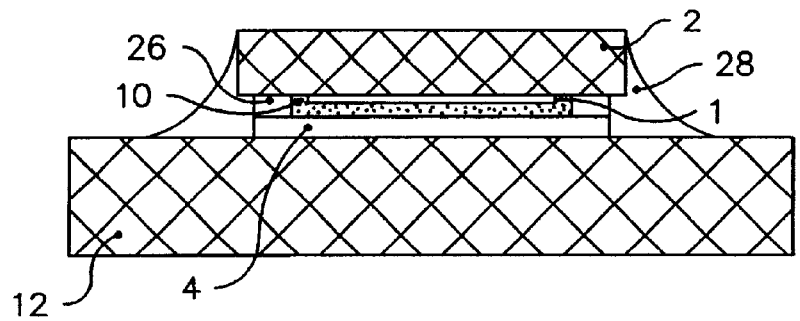
FIG. 7 shows a cross section along the line VII—VII of FIG. 6b.

FIG. 7 shows—similar to FIG. 5—a cross-section along the line VII—VII of FIG. 6b.

Figure 8A:
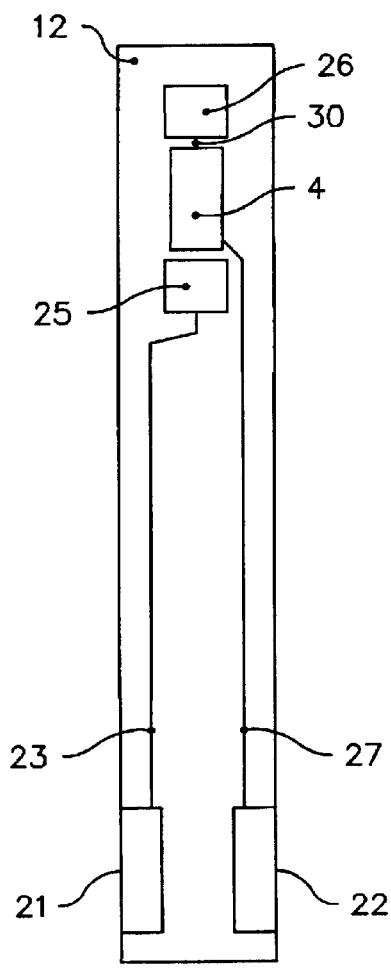
FIG. 8a shows a further embodiment similar to FIG. 6a of a carrier substrate prepared for application of the sensor with additional electrode, wherein a connection contact is electrically connected via the electrode.

In FIG. 8a a construction of the temperature sensor similar to FIG. 4a is shown, wherein, however, a connection contact pad 26 for the resistance layer 1 is connected via electrode 4 directly (in series) with the supply line 27 to connection contact pad 22. The connection point between electrode 4 and connection contact pad 26 is designated with reference numeral 30.

Figure 8B:
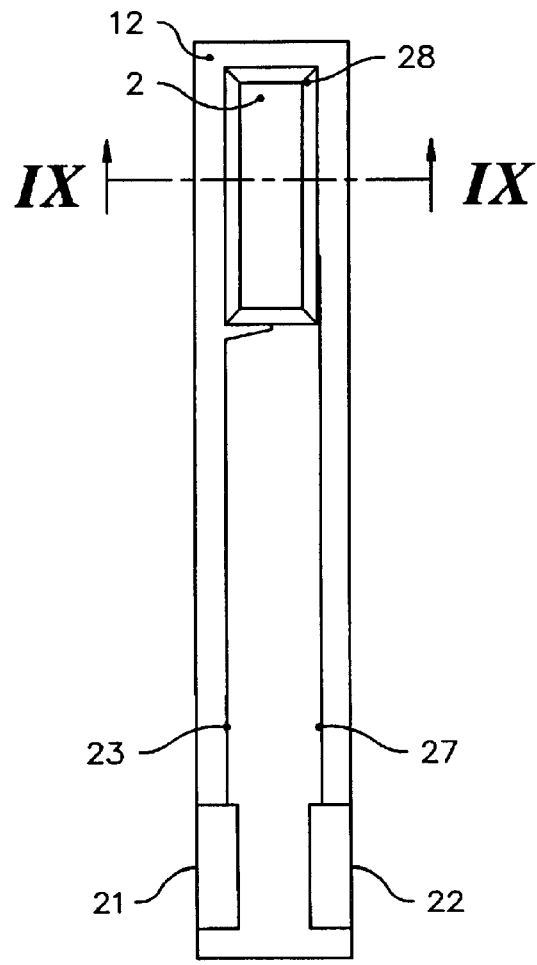

FIG. 8b shows—in similar form as FIG. 4b—a plan view of the finished mounted temperature sensor, wherein the ceramic substrate 2 is seen.

Figure 9:
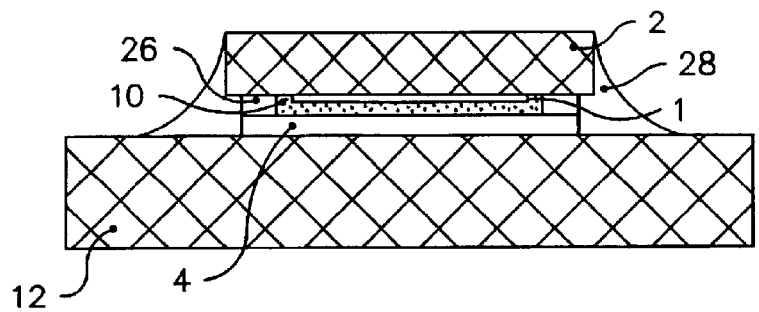
FIG. 9 shows a cross section along line IX—IX of FIG. 8b.

FIG. 9 shows—similar to FIG. 5—a cross-section along line IX—IX according to FIG. 8b.

The manufacture of a temperature sensor according to FIG. 2 proceeds according to the following procedural steps:

1. Application of a platinum resistance layer on the ceramic substrate 2 using PVD (Physical Vapor Deposition), IAD (Ion Assisted Deposition), magnetron-sputtering or resinate printing.
2. Application of a photoresist mask (lacquering in spin coating, lacquer drying, UV-exposure, developing and hardening)
3. Transfer of the resist mask to the platinum resistance layer using ion etching of the areas not covered by the photoresist mask.
4. Removal of the photoresist mask by NaOH or plasma stripping.

5. Application of the Al$_2$O$_3$—barrier layer using magnetron-sputtering sputtering, PVD, CVD, IAD, PIAD, or plasma spraying. The coating of the contact surfaces is prevented by the use of shading masks
6. Application of the additional platinum layer and contact pads using screen printing or PVD or sputtering while using shading masks.
7. Adjustment of the resistor value of the resistance layer using laser trimming.
8. Application of the passivation layer using screen printing.
9. Division of the multi-unit substrate into separate resistor sensors by sawing.
10. Application of the temperature sensor on the carrier substrate with the screen printed structures made of platinum conducting paste by sintering.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. An electrical temperature sensor comprising: a platinum-containing resistance layer (1) as a measuring resistor provided with electrical connections on an electrically insulating surface of a ceramic substrate (2), wherein the resistance layer (1) is provided with at least one layer for protection against contamination or damage, wherein at least one intermediate layer (10) is applied on the resistance layer (1) as a diffusion barrier layer, and wherein an electrode (4) is provided on a side of the resistance layer (1) facing away from the substrate surface and spaced therefrom, wherein the electrode (4) is applied on a carrier substrate (12) lying opposite it and spaced from the resistance layer (1), and wherein the electrode (4) covers a supply line (15) to the resistance layer (1), the supply line (15) being mounted on the carrier substrate (12).

2. The temperature sensor according to claim 1, wherein the electrode (4) is galvanically separated from the supply line (15) by an insulation layer (14).

3. The temperature sensor according to claim 1, wherein a thickness of the intermediate layer (10) lies in range of 0.2 µm to 30 µm.

4. The temperature sensor according to claim 1, wherein the electrode (4) is covered by a passivation layer (3).

5. The temperature sensor according to claim 4, wherein at least one part of the passivation layer (3) is located between the electrode (4) and the resistance layer (1).

6. The temperature sensor according to claim 1, wherein a gap between the measuring resistance (1) and the carrier substrate (12) lying opposite thereto is sealed on all sides with a sealing glass (28) comprising a mixture of SiO$_2$, Al$_2$O$_3$, and BaO having a weight proportion of SiO$_2$ in a range of 20% to 50%.

* * * * *